(12) United States Patent
Pisseloup

(10) Patent No.: US 8,281,563 B2
(45) Date of Patent: Oct. 9, 2012

(54) GAS-TURBINE BEARING OIL SYSTEM WITH IMPROVED OIL RETURN ARRANGEMENT

(75) Inventor: Arnaud Pisseloup, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 895 days.

(21) Appl. No.: 12/379,378

(22) Filed: Feb. 19, 2009

(65) Prior Publication Data

US 2009/0235632 A1 Sep. 24, 2009

(30) Foreign Application Priority Data

Feb. 19, 2008 (DE) .......................... 10 2008 009 822

(51) Int. Cl.
*F02C 7/06* (2006.01)

(52) U.S. Cl. ......................... 60/39.08; 60/772; 184/6.11

(58) Field of Classification Search ................. 60/39.08, 60/772; 184/6.11; 417/313, 426, 406, 407, 417/408, 409, 423.13

See application file for complete search history.

(56) References Cited

U.S. PATENT DOCUMENTS

| | | | |
|---|---|---|---|
| 2,402,467 A * | 6/1946 | Thompson ..................... | 184/6.4 |
| 3,451,214 A | 6/1969 | Bradley | |
| 3,626,693 A * | 12/1971 | Guillot ....................... | 60/39.281 |
| 3,769,790 A | 11/1973 | Thebert | |
| 4,284,174 A | 8/1981 | Salvana et al. | |
| 4,370,956 A | 2/1983 | Moser et al. | |
| 4,441,311 A * | 4/1984 | Rotondo et al. ............. | 60/39.08 |
| 4,511,016 A | 4/1985 | Doell | |
| 4,940,114 A | 7/1990 | Albrecht | |
| 5,253,470 A | 10/1993 | Newton | |
| 7,543,695 B2 * | 6/2009 | Redelman et al. ............ | 192/221 |
| 8,113,317 B2 * | 2/2012 | Delaloye ........................ | 184/6.3 |
| 8,181,746 B2 * | 5/2012 | Szolomayer et al. ........ | 184/6.11 |
| 8,191,686 B2 * | 6/2012 | Galivel .......................... | 184/6.4 |
| 2005/0166570 A1 * | 8/2005 | Granitz et al. ............... | 60/39.08 |
| 2007/0169997 A1 | 7/2007 | Delaloye | |
| 2008/0217105 A1 | 9/2008 | Streifinger | |

FOREIGN PATENT DOCUMENTS

| | | |
|---|---|---|
| DE | 1958813 | 6/1970 |
| DE | 2940643 | 4/1981 |
| DE | 3015650 | 11/1981 |
| DE | 3605619 | 8/1987 |
| DE | 4304482 | 8/1994 |

(Continued)

OTHER PUBLICATIONS

European Search Report dated May 3, 2011 from counterpart European application.

(Continued)

*Primary Examiner* — William H Rodriguez
*Assistant Examiner* — Michael B Mantyla
(74) *Attorney, Agent, or Firm* — Timothy J. Klima; Shuttleworth & Ingersoll, PLC

(57) ABSTRACT

A gas-turbine bearing oil system with an oil supply arrangement includes at least one oil pump 5 supplying oil from an oil tank 1 to the bearing chambers 2, 3, 4 and at least one scavenge pump unit 6 returning oil from the bearing chambers 2, 3, 4 to the oil tank 1 At least one additional electric scavenge pump 7 is used to return oil from at least one bearing chamber 2, 3, 4 to the oil tank 1.

18 Claims, 1 Drawing Sheet

FOREIGN PATENT DOCUMENTS

| | | |
|---|---|---|
| DE | 102005031804 | 1/2007 |
| DE | 102006023580 | 11/2007 |
| EP | 1561908 | 8/2005 |
| EP | 1820944 | 8/2007 |
| EP | 1847698 | 10/2007 |
| FR | 2358615 | 2/1978 |
| GB | 509238 | 7/1939 |
| JP | 62176599 | 11/1987 |

OTHER PUBLICATIONS

German Search Report dated Apr. 22, 2009 from counterpart German application.
German Search Report dated Dec. 9, 2010 from related application.
European Search Report dated Oct. 1, 2010 from related application.

* cited by examiner

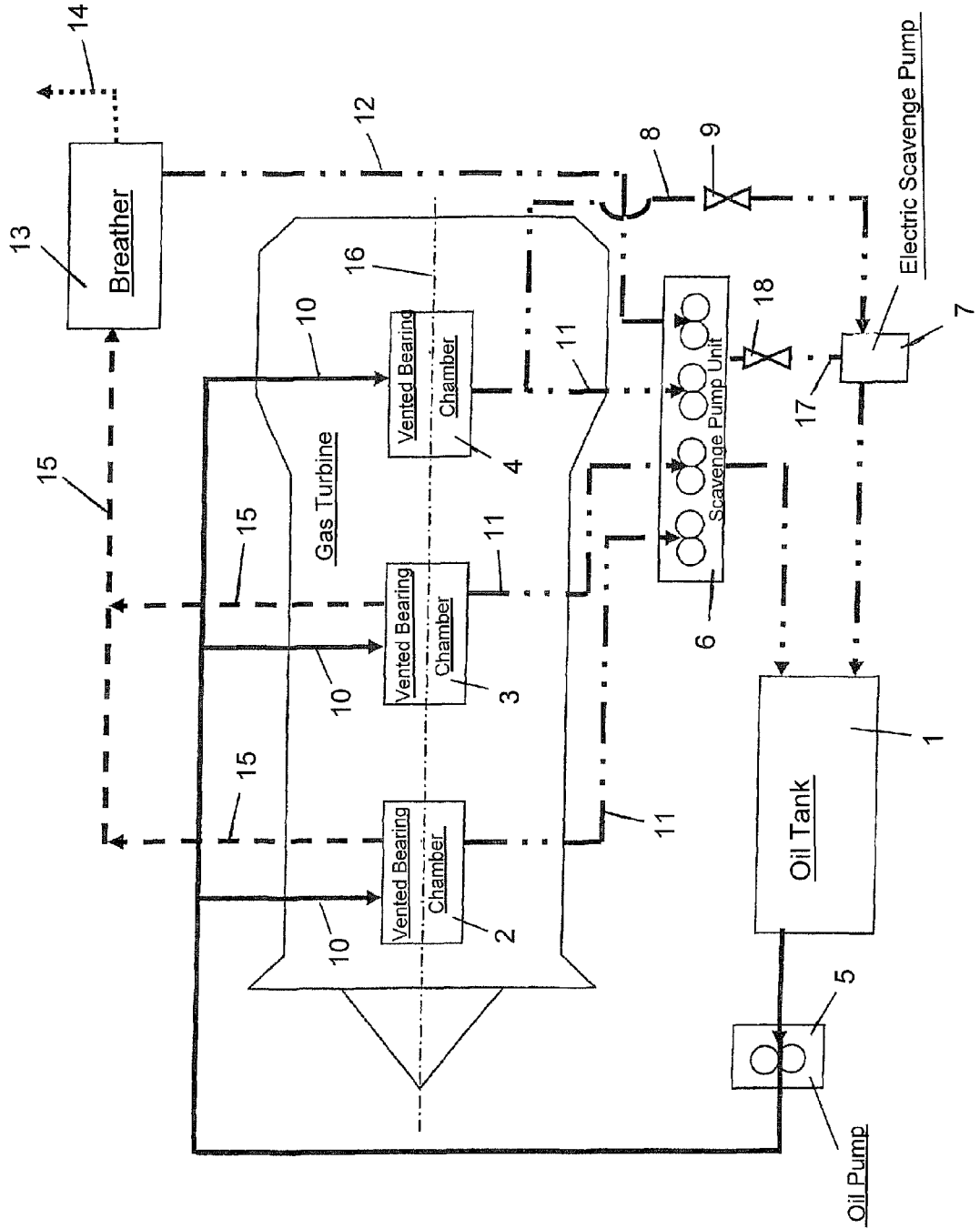

GAS-TURBINE BEARING OIL SYSTEM WITH IMPROVED OIL RETURN ARRANGEMENT

This application claims priority to German Patent Application DE 102008009822.1 filed Feb. 19, 2008, the entirety of which is incorporated by reference herein.

The present invention relates to a gas-turbine bearing oil system.

More particularly, this invention relates to an oil system in which oil is returned from the bearing chambers of a gas turbine to an oil tank by a scavenge pump unit.

Such an oil system is known from EP 1 561 908 A2, for example.

Known oil return systems of bearing chambers of gas turbines employ at least one scavenge pump unit. Each bearing chamber is here connected to its particular scavenge pump. The individual scavenge pumps are driven via a common drive shaft. The oil pump for the supply of oil is here usually also part of the scavenge pump unit and is driven together with the latter via the same drive shaft. Accordingly, all pumps are mechanically connected by one or two drive shafts to the high-pressure shaft of the gas turbine via a gearbox unit. This means that the pumps are no longer driven when the gas turbine is run down or shut down.

Oil leakage from the bearing chambers via the air seals may therefore occur at shutdown or standstill of the gas turbine when the bearing air pressure decreases and the pressure in the bearing chamber consequently falls to a lower value.

It is a broad aspect of the present invention to provide a gas-turbine bearing oil system of the type specified at the beginning, which, while being simply designed and featuring a high degree of operational reliability, can be manufactured easily and cost-effectively and avoids oil leakage at standstill or rundown of the gas turbine.

The present invention therefore provides for an additional electric scavenge pump for the return of oil from at least one bearing chamber to the oil tank.

The arrangement according to the present invention provides for maintaining the scavenging capacity for oil from the bearing chamber also in the event of the gas turbine being run down or shut down. Therefore, in accordance with the present invention, all oil is returned from the bearing chamber, thereby avoiding oil leakage, as oil is less likely to be flushed out by the air flow of the seal in the event of a flow reversal of the bearing air.

Furthermore, pressure reversal within the bearing chamber by outflowing oil will be precluded by avoiding flow reversal. This also proves to be advantageous.

The present invention, while being applicable to unvented bearing chambers, can also be provided for vented bearing chambers.

In accordance with the present invention, an additional electric scavenge pump is therefore provided which can also be of small size and either be arranged separately or be associated to the scavenge pump unit with the several mechanical scavenge pumps.

The additional electric scavenge pump according to the present invention is activated preferably at shutdown or rundown of the gas turbine and will then provide for the return of oil (oil scavenge) independently of whether the high-pressure shaft of the turbine still rotates or is at rest.

In accordance with the present invention, the electric scavenge pump (or the several electric scavenge pumps) can be provided in a bypass leading around the mechanical pumps of the scavenge pump unit.

In accordance with the present invention, it is particularly favorable if such a bypass is closed by a shut-off element or a valve as long as the gas turbine is running and the mechanical scavenge pump unit is in operation. Thus, leakage through the electric scavenge pump is avoided during operation of the mechanical scavenge pump unit.

The shut-off element/shut-off device/valve can, for example, be actuated mechanically. This may be accomplished via a pressure difference between a pressure source for bearing air and another pressure source of the bearing chamber. Here, the pressure available during operation of the gas turbine is advantageously used.

The shut-off device can also be mechanically actuated by using the oil pressure in the oil supply line from the mechanical oil pump to the bearing chambers to close the shut-off device when the gas turbine is running. Consequently, when the gas turbine is shut down or run down, a pressure drop or negative pressure difference will occur which is capable of actuating the shut-off device.

The at least one additional electric scavenge pump according to the present invention can be driven by electrical power supplied by an additional generator, an auxiliary power unit (APU) or an integrated drive generator (IDG). However, since the electric scavenge pump need only be operated over a limited period of time, namely for the discharge of the residual oil from the bearing chambers during rundown or upon standstill of the gas turbine, provision can—in a particularly advantageous manner—also be made for an additional storage of electric power (battery). In this respect, there is no need to store a large quantity of power.

It is therefore advantageous in accordance with the present invention that the oil is discharged from the bearing chambers over at least a limited, minimum period of time and a pressure decrease correspondingly is effected in the oil system also upon shutdown or standstill of the gas turbine. A pressure reversal in the bearing chambers is therefore avoided. Furthermore, the hazard of oil leakage is avoided, resulting in an overall lower oil consumption.

The present invention is more fully described in light of the accompanying drawing showing a preferred embodiment. In the drawing, FIG. 1 is a schematic representation of a gas-turbine bearing oil system.

Oil is stored in an oil tank 1 and pumped into vented bearing chambers 2, 3 and into an unvented bearing chamber 4 by an oil pump 5. This is accomplished via at least one supply line 10. Furthermore, a scavenge pump unit 6 is provided which is mechanically driven and discharges oil from the bearing chambers 2, 3 and 4 via scavenge lines 11 to the oil tank 1.

FIG. 1 further shows a breather 13 which is connected to the bearing chambers 2, 3 and 4 via a vent line 15 to discharge air and separate oil. The oil is returned to the scavenge pump unit 6 via a scavenge line 12, while the air is bled via an external vent line 14.

FIG. 1 shows a machine axis 16.

In accordance with the present invention, at least one electric scavenge pump 7 is provided which is connected to at least the unvented bearing chamber 4 via a scavenge line 8. Provided in the scavenge line 8 is a mechanically or electrically actuatable shut-off device 9.

Furthermore, FIG. 1 shows a scavenge line 17 which is provided with a mechanical shut-off device 18 (mechanically or electrically actuatable) to discharge oil from the bearing chambers 2, 3 and 4 at standstill of the mechanical scavenge pump unit 6.

List Of Reference Numerals
1 Oil tank
2 Vented bearing chamber
3 Vented bearing chamber
4 Unvented bearing chamber
5 Oil pump
6 Scavenge pump unit
7 Electric scavenge pump
8 Scavenge line
9 Shut-off device
10 Supply line
11 Scavenge line
12 Scavenge line
13 Breather
14 External vent line
15 Vent line
16 Machine axis
17 Scavenge line
18 Shut-off device

What is claimed is:

1. A gas turbine bearing oil supply system, comprising:
at least one oil pump for supplying oil from an oil tank to a plurality of bearing chambers of a gas turbine;
at least one scavenge pump unit for returning oil from the bearing chambers to the oil tank; and
at least one additional electric scavenge pump for returning oil from at least one of the bearing chambers to the oil tank;
a separate scavenge line connecting the at least one of the bearing chambers and the at least one additional electric scavenge pump, the separate scavenge line connecting to the at least one of the bearing chambers for evacuation of residual oil from the at least one of the bearing chambers;
a shut-off device positioned in the separate scavenge line for selectively closing the separate scavenge line.

2. The system of claim 1, wherein the electric scavenge pump is actuatable upon standstill of the gas turbine.

3. The system of claim 1, wherein the electric scavenge pump is integrated into the scavenge pump unit.

4. The system of claim 1, wherein the electric scavenge pump is separately arranged from the scavenge pump unit.

5. The system of claim 1, wherein the shut-off device is mechanically actuatable by pressure differences between a bearing air pressure source and an internal pressure of the bearing chamber.

6. The system of claim 1, wherein the shut-off device is actuatable by an oil pressure in the system when the gas turbine is in operation.

7. The system of claim 1, wherein the electric scavenge pump is supplied with electric power via a gas turbine power supply.

8. The system of claim 1, wherein the electric scavenge pump is supplied with electric power via a separate battery.

9. A method for operating a gas turbine bearing oil supply system, comprising:
supplying oil from an oil tank to a plurality of bearing chambers with at least one oil pump during operation of the gas turbine;
returning oil from the bearing chambers to the oil tank with at least one scavenge pump unit during operation of the gas turbine; and
in the event of at least one of running down and shutting down of the gas turbine, returning oil from at least one of the bearing chambers to the oil tank with at least one additional electric scavenge pump;
providing a separate scavenge line connecting the at least one of the bearing chambers and the at least one additional electric scavenge pump, the separate scavenge line connecting to the at least one of the bearing chambers for evacuation of residual oil from the at least one of the bearing chambers;
providing a shut-off device positioned in the separate scavenge line for selectively closing the separate scavenge line.

10. The method of claim 9, and further comprising operating the electric scavenge pump only until residual oil is evacuated from the bearing chamber.

11. The method of claim 10, and further comprising operating the electric scavenge pump independently of whether a high-pressure shaft of the gas turbine is rotating.

12. The method of claim 11, and further comprising operating the electric scavenge pump to bypass mechanical pumps of the scavenge pump unit.

13. The method of claim 12, and further comprising isolating the electric scavenge pump from the mechanical pumps of the scavenge pump unit when the scavenge pump unit is operating.

14. The method of claim 13, and further comprising isolating the electric scavenge pump from the mechanical pumps of the scavenge pump unit dependent upon a pressure difference between a pressure source for bearing air and a pressure of the bearing chamber.

15. The method of claim 9, and further comprising operating the electric scavenge pump independently of whether a high-pressure shaft of the gas turbine is rotating.

16. The method of claim 9, and further comprising operating the electric scavenge pump to bypass mechanical pumps of the scavenge pump unit.

17. The method of claim 9, and further comprising isolating the electric scavenge pump from the mechanical pumps of the scavenge pump unit when the scavenge pump unit is operating.

18. The method of claim 9, and further comprising isolating the electric scavenge pump from the mechanical pumps of the scavenge pump unit dependent upon a pressure difference between a pressure source for bearing air and a pressure of the bearing chamber.

* * * * *